(12) United States Patent
Kowalewski

(10) Patent No.: US 7,260,076 B1
(45) Date of Patent: Aug. 21, 2007

(54) METHOD AND DEVICE FOR TRANSMITTING DATA

(75) Inventor: Frank Kowalewski, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 948 days.

(21) Appl. No.: 10/089,434

(22) PCT Filed: Sep. 28, 2000

(86) PCT No.: PCT/DE00/03417

§ 371 (c)(1),
(2), (4) Date: Dec. 30, 2002

(87) PCT Pub. No.: WO01/24395

PCT Pub. Date: Apr. 5, 2001

(30) Foreign Application Priority Data

Sep. 30, 1999 (DE) ................. 199 46 872

(51) Int. Cl.
*H04B 7/216* (2006.01)
(52) U.S. Cl. ............... 370/335; 370/342; 375/140
(58) Field of Classification Search ........... 370/342, 370/326, 335; 375/144, 147–149, 267, 349
See application file for complete search history.

(56) References Cited

U.S. PATENT DOCUMENTS

| | | | | |
|---|---|---|---|---|
| 5,550,809 A | * | 8/1996 | Bottomley et al. | 370/342 |
| 5,748,687 A | * | 5/1998 | Ozluturk | 375/367 |
| 5,920,552 A | * | 7/1999 | Allpress et al. | 370/335 |

FOREIGN PATENT DOCUMENTS

| | | |
|---|---|---|
| DE | 19616828 | 7/1997 |
| EP | 0814581 | 12/1997 |
| EP | 0878930 | 11/1998 |
| EP | 0 936 749 | 8/1999 |
| FR | 2770058 | 4/1999 |
| WO | WO99 03225 | 1/1999 |

OTHER PUBLICATIONS

Adachi, F., et al., "Wideband DS-CDMA for Next-Generation Mobile Communications Systems," IEEE Communications Magazine, Sep. 1, 1998, vol. 36, No. 9, pp. 56-69.

A. Klein, G.K. Kaleh and P.W. Baier: "Zero Forcing and Minimum Mean-Square-Error Equalization for Multiuser Detection in Code-Division Multiple Access Channels", IEEE Trans. Vehic. Tech., vol. 45 (1996), 276-287.

* cited by examiner

*Primary Examiner*—Wing Chan
*Assistant Examiner*—Richard Chang
(74) *Attorney, Agent, or Firm*—Kenyon & Kenyon LLP

(57) ABSTRACT

A data transmission method in which a CDMA-coded data signal is transmitted between a transmitter and a receiver in the form of a data stream of spread data bursts, with hierarchical CDMA codes used for transmission. Spread data is detected in a first step according to a mother code of at least one receiving code. The detected data is despread in a second step by despreading it using at least one generator. The detection process is aborted in a third step if the data has been despread to a sufficient extent, or, if this is not the case, the second step is repeated using the data last despread until the data has been despread to a sufficient extent.

6 Claims, 1 Drawing Sheet

$$c(3,1) = c(2,1) \otimes a$$
$$c(2,1) = c(1,1) \otimes a$$
$$c(3,2) = c(2,1) \otimes b$$
$$c(1,1)$$
$$c(3,3) = c(2,2) \otimes a$$
$$c(2,2) = c(1,1) \otimes b$$
$$c(3,4) = c(2,2) \otimes b$$

SF.: 1     2     4

METHOD AND DEVICE FOR TRANSMITTING DATA

FIELD OF THE INVENTION

The present invention relates to a data transmission method in which a CDMA-coded data signal is transmitted between a transmitter and a receiver in the form of a data stream of spread data bursts, with hierarchical CDMA codes used for transmission. The present invention also concerns a data transmission device.

BACKGROUND INFORMATION

Although, in principle, applicable to any data transmission system, the present invention is explained on the basis of a cellular CDMA (Code Division Multiple Access) data transmission system.

CDMA-coded data transmitted via multipath channels may be detected by rake reception or methods which eliminate mutual data interference.

In particular, Code Division Multiple Access (CDMA) enables multiple data streams to be transmitted simultaneously via a common frequency band. Using spreading codes, the data stream symbols to be transmitted are converted into signal fragments of the same length as the spreading codes. The signal fragments of the data symbols corresponding to a point in time are summed up and the summed fragments are transmitted according to their time sequence, as is described in K. D. Kammeyer, Message Transmission, $2^{nd}$ Edition, Information Technology Series, Teubner, Stuttgart, 1996.

The received signal fragments may be converted back to the data symbols of the data streams by despreading them with the spreading codes. If the signals are transmitted via multiple paths (as in the case of mobile telephony), it may be advantageous to despread the signals separately for all paths and, after weighting the despread signals on all paths (using the coefficients of the channel pulse response), sum them up again. A CDMA receiver which operates in this manner may be called a rake receiver.

Multipath transmission may cause mutual interference of the transmitted signals at the receiver. In contrast to the rake receiver, this interference may be eliminated in the receiver, for example by joint detection (JD), as described in A. Klein, G. K. Kaleh and P. W. Baier: "Zero Forcing and Minimum Mean-Square-Error Equalization for Multiuser Detection in Code-Division Multiple-Access Channels", IEEE Trans. Vehic. Tech., Vol. 45 (1996), 276-287.

CDMA codes having a large spreading factor may be constructed from two codes having a smaller spreading factor, using Kronecker multiplication. A set of CDMA codes constructed in this manner may be referred as a hierarchical code set. The OVSF (Orthogonal Variable Spreading Factor) codes used in UMTS (Universal Mobile Telephone System) are hierarchically constructed codes (see Concept Group Alpha: "EVALUATION DOCUMENT (DRAFT 1.0), Part 1", ETSI Tdoc SMG2 270/97).

The rake receiver and the joint detection method for receiving hierarchical codes may be unnecessarily complex and unnecessarily expensive.

SUMMARY OF THE INVENTION

In accordance with an example embodiment of the present invention, the received CDMA signals may be first detected using a smaller-than-necessary spreading factor and may then be despread using the codes employed to construct the hierarchical codes.

A data transmission method according to an example embodiment of the present invention may allow the detection of data spread using hierarchical codes to be less expensive than when employing a rake receiver or performing joint detection of the user data.

According to one example embodiment, the data may be detected by a rake receiver in a first step, and despreading may be performed in a despreading device connected downstream from the rake receiver.

According to another example embodiment, a preliminary despreading operation may be performed in the rake receiver (RE).

According to a further example embodiment, the data may be detected by a JD receiver in the first step, using a detection method which eliminates mutual interference of the transmitted data, and despreading may occur in a despreading device connected downstream from the JD receiver.

According to a further example embodiment, a preliminary despreading operation may be performed in the JD receiver.

DETAILED DESCRIPTION

Figure 1:
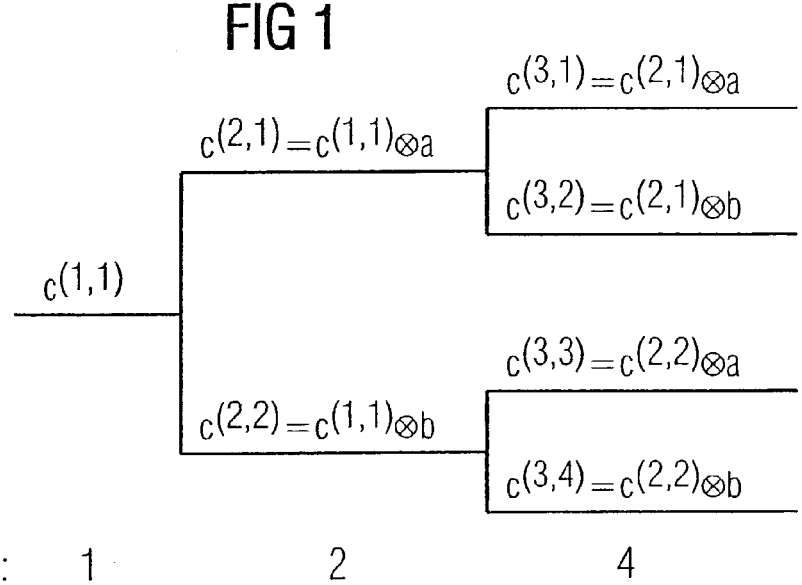
FIG. 1 shows a representation of a hierarchical code tree which illustrates one example embodiment of the present invention.

FIG. 1 shows a construction of hierarchical codes. In FIG. 1, reference symbol SF represents the spreading factor and $c^{(i,j)}$ represents the corresponding spreading codes.

Codes $c^{(i+1,k)}$ having a larger spreading factor are formed by Kronecker multiplication from a given code $c^{(i,j)}$ which has a smaller spreading factor, using generators a, b.

The structure of hierarchical codes may make it possible to iteratively despread hierarchically spread data in the receiver, using a corresponding inverse Kronecker multiplication operation.

In the present example embodiment, CDMA data may be transmitted with hierarchical codes via a multipath channel, using OVSF codes according to FIG. 1 and a rake reception method in the receiver.

However, the rake reception method is different from the related art, since complete despreading does not occur within the rake receiver, but rather in downstream despreaders. In the example embodiment, despreading is not performed in the rake receiver.

Figure 2:
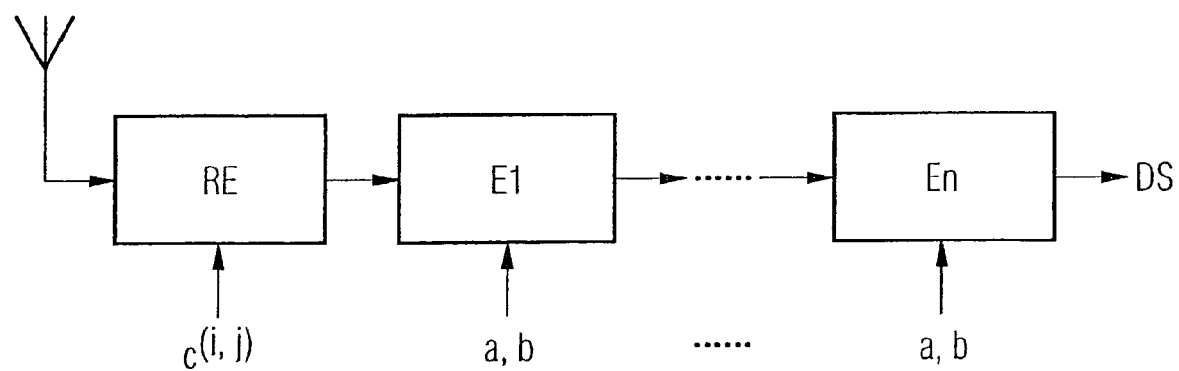
FIG. 2 shows a block diagram of a device for detecting hierarchically coded CDMA signals according to one example embodiment of the present invention.

FIG. 2 shows a corresponding device. In FIG. 2 reference symbol RE represents a rake receiver, E1 . . . En are despreaders, and DS represents the despread data symbols.

The rake receiver first detects the data corresponding to mother code $c^{(l,1)}$, using the conventional rake reception method.

The master data detected in the previous step may then be despread by despreading it with generators a and/or b, thereby calculating a mother code of the receiving code using a larger spreading factor: SF=2 in this case.

The master data detected in the previous step may then be despread again, using SF=2, by despreading it with generators a and/or b, thereby calculating the receiving data using spreading factor SF=4, which may then be output for further processing as data stream DS.

If the data obtained in the second step has been despread to a sufficient extent, it may be considered accepted as the detected data. If this is not the case, the second step may be repeated using the data obtained in the previous second step until the receiving data is available.

For this purpose, the receiver may also detect the spreading factor of the data output by rake receiver RE as well as generators a and b.

Although the present invention is described above on the basis of an example embodiment, it is not limited to this embodiment but may be modified in many different ways.

Although the first example embodiment involves transmitting CDMA data having hierarchical codes via a multipath channel having OVSF codes according to FIG. 1 and performing a rake reception method in the receiver, a joint-detection (JD) reception method may also occur in the receiver.

In particular, the example method according to the present invention may be applied to all data transmission systems which use a transmission mode in which data coded with hierarchical CDMA codes are to be detected.

Although the rake receiver may not perform a despreading operation in the example embodiment, the rake receiver may perform a preliminary despreading operation, e.g., using SF=2.

What is claimed is:

1. A data transmission method, comprising:
    transmitting a CDMA-coded data signal between a transmitter and a receiver in the form of a data stream of spread data bursts using hierarchical CDMA codes, each of the hierarchical CDMA codes being formed from a mother code by Kronecker multiplication using at least one generator, wherein a spreading factor for the mother code is smaller than a spreading factor for a corresponding hierarchical CDMA code;
    detecting data corresponding to the mother code of at least one of the codes;
    despreading the detected data by inverse Kronecker multiplication using the at least one generator; and
    aborting the detecting if the data has been despread to the extent that received data is produced, otherwise repeating the despreading step with the most recently despread data.

2. The method according to claim 1, wherein the detecting step includes detecting the data using a rake receiver, and wherein the despreading step includes despreading the detected data using a despreading device connected downstream from the rake receiver.

3. The method according to claim 2, further comprising:
    performing a preliminary despreading operation in the rake receiver.

4. The method according to claim 1, wherein the detecting step includes detecting the data using a joint detection receiver configured to eliminate mutual interference of transmitted data, and wherein the despreading step includes despreading the detected data using a despreading device connected downstream from the joint detection receiver.

5. The method according to claim 4, further comprising:
    performing a preliminary despreading operation in the joint detection receiver.

6. A device for receiving a CDMA-coded data signal transmitted in the form of a data stream of spread data bursts using hierarchical CDMA codes, each of the hierarchical CDMA codes being formed from a mother code by Kronecker multiplication using at least one generator, wherein a spreading factor for the mother code is smaller than a spreading factor for a corresponding hierarchical CDMA code, comprising:
    a first stage configured to detect spread data according to the mother code of at least one of the codes; and
    a second stage downstream from the first stage configured to despread the detected data by inverse Kronecker multiplication using the at least one generator, the second downstream stage being configured to: a) abort detection if the data has been despread to the extent that received data is produced; and b) otherwise repeat the despreading using the data last despread until the data has been despread to the extent that received data is produced.

* * * * *